United States Patent
Bzoza

(10) Patent No.: US 8,910,994 B2
(45) Date of Patent: Dec. 16, 2014

(54) FREE BREEZE ACCELERATOR

(71) Applicant: Russell John Bzoza, San Diego, CA (US)

(72) Inventor: Russell John Bzoza, San Diego, CA (US)

(*) Notice: Subject to any disclaimer, the term of this patent is extended or adjusted under 35 U.S.C. 154(b) by 0 days.

(21) Appl. No.: 14/048,024

(22) Filed: Oct. 7, 2013

(65) Prior Publication Data

US 2014/0097639 A1 Apr. 10, 2014

Related U.S. Application Data

(60) Provisional application No. 61/711,748, filed on Oct. 10, 2012.

(51) Int. Cl.
*B60J 9/04* (2006.01)
*B62D 35/00* (2006.01)

(52) U.S. Cl.
CPC .............. *B62D 35/008* (2013.01); *B62D 35/00* (2013.01)
USPC .......................................... 296/91; 296/180.1

(58) Field of Classification Search
CPC .................................................... B62D 35/008
USPC ............... 296/91, 180.1, 180.2, 180.3, 180.4, 296/180.5
See application file for complete search history.

(56) References Cited

U.S. PATENT DOCUMENTS

| 3,695,673 | A | * | 10/1972 | Meadows .................... 296/180.2 |
| 4,141,580 | A | | 2/1979 | Ivan |
| 4,316,630 | A | | 2/1982 | Evans |
| 4,863,213 | A | * | 9/1989 | Deaver et al. .............. 296/180.1 |
| 6,669,270 | B1 | | 12/2003 | Card et al. |
| D683,678 | S | | 6/2013 | Willard |
| 2005/0110301 | A1 | * | 5/2005 | Dringenberg et al. ..... 296/180.5 |
| 2008/0150315 | A1 | * | 6/2008 | Benoit ............................ 296/91 |

OTHER PUBLICATIONS

Stephen Ryle, Nov. 2, 2012, pp. 1-3,Test 1235, San Diego Air & Space Technology Center Low Speed Wind Tunnel, San Diego, CA.

* cited by examiner

*Primary Examiner* — Lori L Lyjak
(74) *Attorney, Agent, or Firm* — Coastal Patent Law Group, P.C.; Joshua S. Schoonover

(57) ABSTRACT

This disclosure concerns a wind diverting device having a first hollow triangular body portion engaged with a second hollow triangular body portion in a concentrically nested manner for slideability therebetween, and a pair of opposing end caps configured to attach to each respective terminal end of the nested triangular bodies; wherein the wind diverting device is configured to attach to a window frame or similar object for diverting laterally passing wind into an opening of an enclosed structure.

6 Claims, 5 Drawing Sheets

8,910,994 B2

FREE BREEZE ACCELERATOR

CROSS-REFERENCE TO RELATED APPLICATIONS

This application claims the benefit of priority with U.S. provisional patent application Ser. No. 61/711,748, filed Oct. 10, 2012.

BACKGROUND OF THE INVENTION

1. Field of the Invention

The present embodiment relates to a wind diverter device that is mounted on an exterior surface in front of an opening to an interior structure, such as a window, for the purpose of capturing and redirecting wind in a lateral bi-directional manner into the interior of the structure.

2. Description of the Related Art

Previously, a device or apparatus with the capability to deflect or re-direct air has been manufactured having a rectangular, curved, angled, wedged or a right triangular form which is mounted on a given structure such as the top of a semi-truck, the rear cab of a pickup truck, or in front of a ceiling air vent. In U.S. Pat. No. D683,678 to Weakes and Jacobs, air vent deflectors are designated for use with an air vent in a suspended ceiling grid of an interior structure with the purpose of redirecting forced air flow down and away from air vents to reduce the amount of debris accumulating on the grid and ceiling tiles. The air deflector prevents air vents from blowing in one direction by using metal foils. In reference to air deflectors stated for use in the automotive industry as in U.S. Pat. No. 4,316,630 to Evans, and U.S. Pat. No. 4,141,560 to Ivan, such air deflectors have proven to reduce wind displacement, eliminate drag, increase fuel mileage, and reduce the amount of road debris. Whereby, the air flow moves over an angled shield like design and away from a semi-truck or trailer while in transit. In addition, an air deflector that is vertically mounted, proposed by U.S. Pat. No. 6,669,270 to Card and Card, also considered an air foil, embodies two long hollow wedge type forms that are mounted perpendicular at the rear cab of a pickup truck, thus affecting the air flow away from the vehicle.

Although the above mentioned air deflectors all redirect air flow away from the vent or vehicle, the present wind device, has the advantage of capturing and redirecting wind with the purpose of increasing ventilation into an interior structure. While U.S. Pat. No. 6,669,270 to Card and Card also proposes mounting their embodiment vertically, the present proposed embodiment is enclosed by end caps instead of remaining hollow, mounts at the end of each end cap instead of mounting flat, and is telescopic to allow adjustment in a variety of structural frames whereas Card and Card's air deflector is non-adjustable. While the above wind deflectors are suitable for their intended applications, none are intended to capture and re-direct air into an interior structure using only natural wind.

SUMMARY

In accordance with one embodiment, wind is captured and redirected bilaterally into an open structure by means of a curved telescopic triangular embodiment. The upper larger triangular body is of slightly larger width, thus overlapping on top of the lower smaller triangular body and held into place. In addition, the embodiment is comprised of two end caps, one also of slightly larger width than the other, and inserted according to width into the opposing end of the main body by use of a triangular sleeve and secured by retaining screws. Prior to installation, the said body is placed in a vertical position, whereby it is adjusted and then mounted to the flat mounting side of each said end cap using either an independent bonding agent or by the use of independent screws, which can be inserted into two parallel holes that exist on the flat side of each of said end caps.

Advantages of the Invention

Accordingly, several advantages exist in the function of the wind diverter, herein referred to the "free breeze accelerator", and these advantages are detailed as follows:

(a) wind flow is captured and re-directed in a bilateral manner without use of electricity, using only nature's power to increase ventilation into an open structure;

(b) the free breeze accelerator is lightweight and can be easily adjusted to different lengths to fit various exterior frames by means of an expansion that is telescopic and adjusted by manual operation;

(c) the free breeze accelerator can be made using polyvinyl chloride (PVC) in order to withstand wind speeds of over 40 mph, which was tested and demonstrated as being effective at the San Diego Low Speed Wind Tunnel, and documented in Test Data 1235;

(d) the use of such materials as polyvinyl chloride (PVC) offer the advantage of UV protection and weather resistance;

(e) the free breeze accelerator can be extruded using recyclable materials such as polyvinyl chloride (PVC), thereby qualifying for status as a green product;

(g) the free breeze accelerator can be manufactured with the option of using a variety of colors as well as pigments that are water based, thus it is less toxic to the environment;

(h) the free breeze accelerator can be extruded in several different lengths and widths to accommodate a variety of structures;

(i) the option of attaching the end caps to various exterior structures by means of bonding agent allows the option to vertically mount the said embodiment without drilling;

(j) the assembled free breeze accelerator resists the infestation of vermin, bees and other insects by securing each component so that no holes or gaps exist;

(k) once mounted, the free breeze accelerator itself requires no further operation;

(l) the free breeze accelerator functions using silent operation; and (m) the free breeze accelerator has the ability to be detached manually from the exterior surface and then relocated to an alternate location.

DETAILED DESCRIPTION

Figure 1:
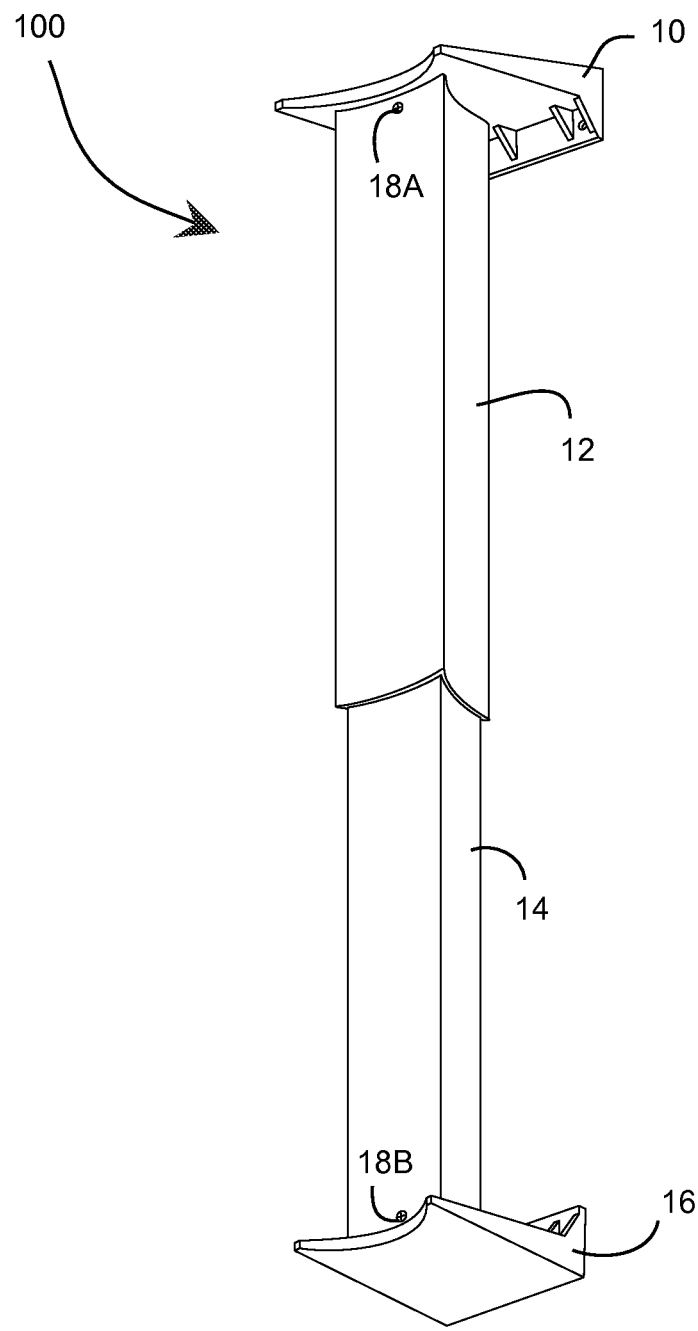
FIG. 1 shows a free breeze accelerator in fully assembled form in accordance with an embodiment.

Referring now to FIG. 1, the wind diverter device 100 is in complete assembled form, prior to vertical installation, wherein the larger upper triangular body, or "first hollow elongated triangular body 12" overlaps the smaller lower triangular body, or "second hollow elongated triangular body 14", with the first larger top end cap 10, and the second smaller bottom end cap 16 positioned accordingly to their opposing ends of the main body, and each secured by a retaining screw 18A and 18B, the opposing end caps being perpendicular with respect to the triangular bodies.

Figure 2:
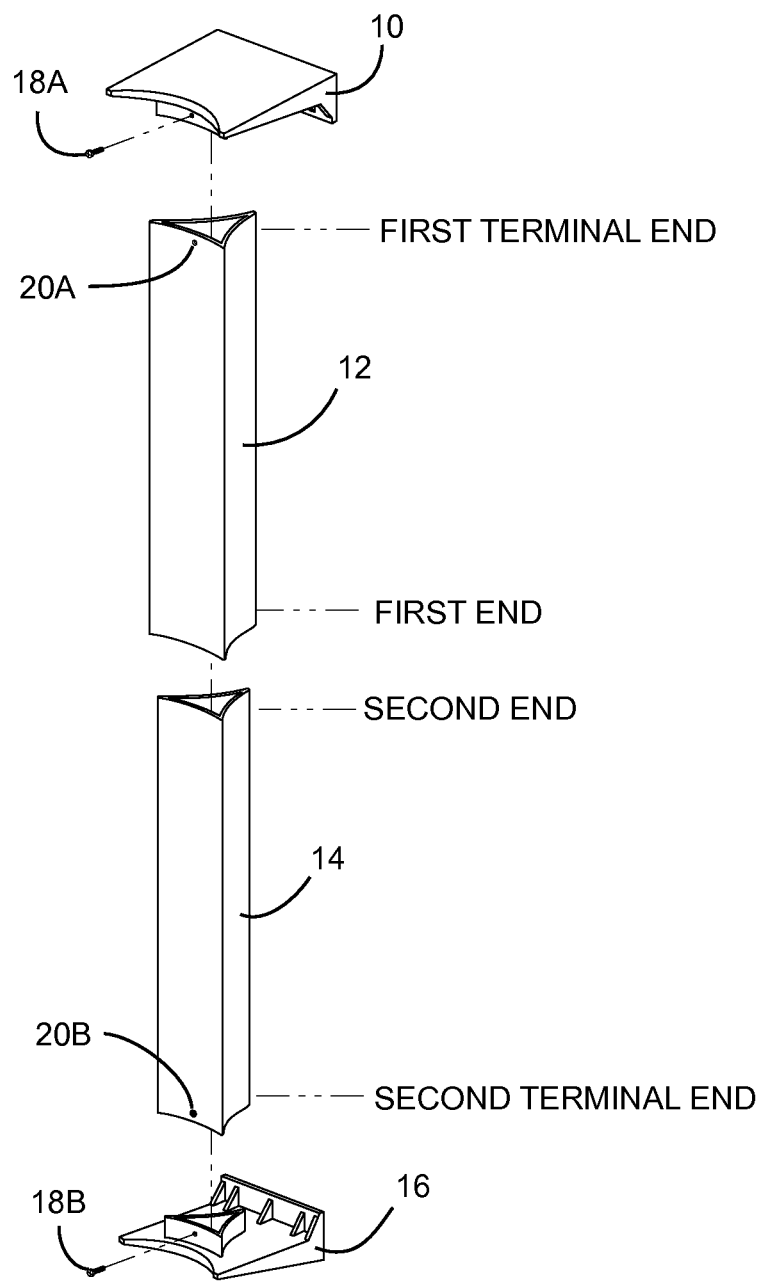
FIG. 2 shows an exploded perspective view of the free breeze accelerator in accordance with the illustrated embodiment.

Referring now to FIG. 2, the wind diverter device is seen from an exploded view prior to assembly and prior to installation with each component: first hollow elongated triangular body 12, second hollow elongated triangular body 14, the second end cap 16, first end cap 10, and retaining screws 18A, 18B directly adjacent to their coordinating hole; the first hollow elongated triangular body 12 will be slightly larger than the second hollow elongated triangular body 14 in order to slideably communicate with the slightly larger opening of the second hollow elongated triangular body 14. In accordance therewith, the second sleeve flange 30B (FIG. 4) of the second end cap 16 will be of slightly smaller width than the first end cap sleeve flange 30A (FIG. 3) to communicate with said body portions 12,14. Retaining screws 18A; 18B are inserted through body holes 20A; 20B and further through flange holes 22A; 22B, to secure the respective ends of the adjustable tubular body to the first and second end caps, 10; 16, respectively.

Figure 3:
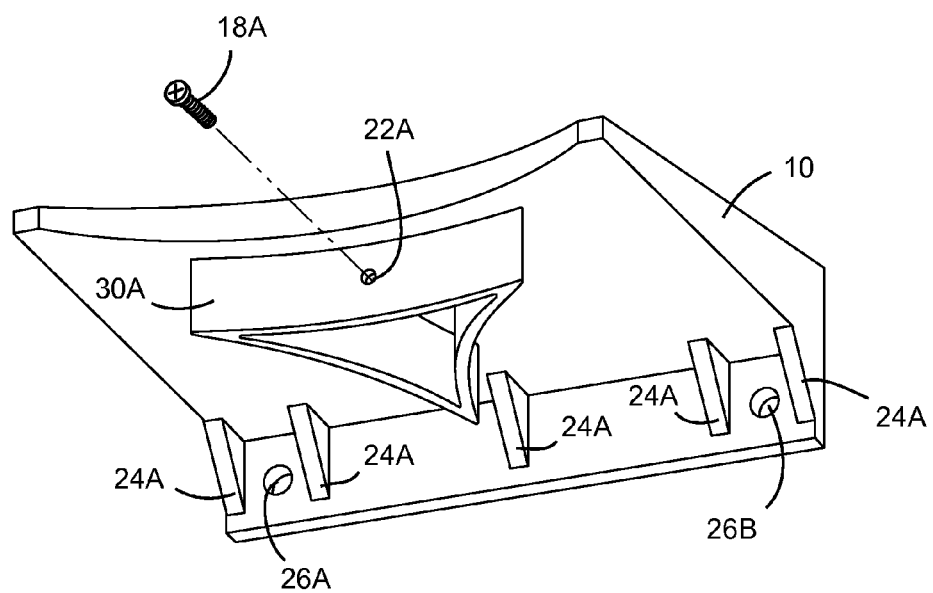
FIG. 3 shows the larger top end cap from a perspective view prior to assembly, and further illustrating various aspects of the larger end cap with reinforcement braces, an inner triangular shaped sleeve, and a retaining screw hole to be attached with the retaining screw in accordance with the illustrated embodiment.

Referring now to FIG. 3, the first larger top end cap 10 is seen from a perspective view with the first triangular sleeve flange 30A facing downward from a center of the first end cap 10, the retaining screw flange hole 22A from an exterior view, the reinforcement braces 24A facing downward, and the two parallel mounting holes 26A, 26B also seen from a downward interior position.

Figure 4:
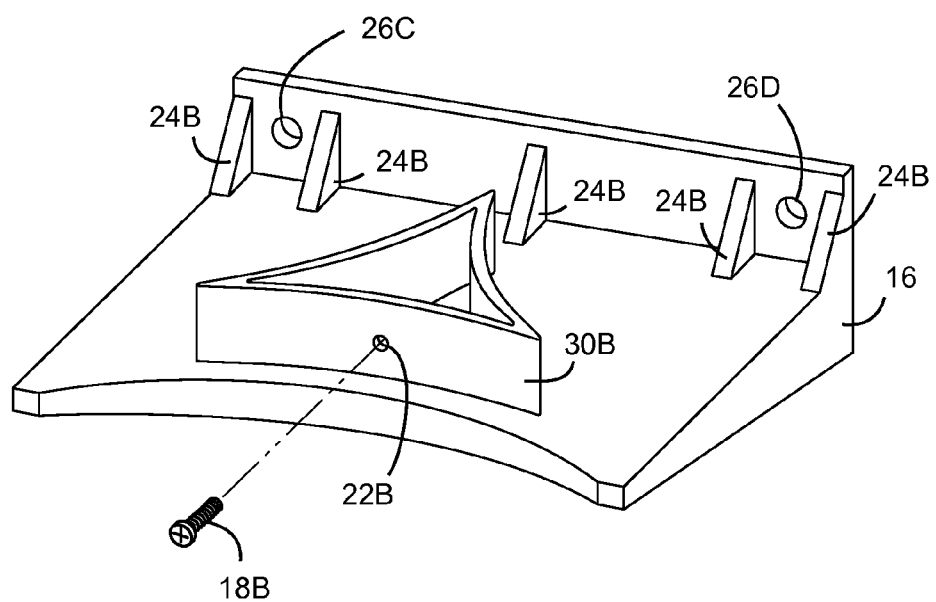
FIG. 4 shows the smaller bottom end cap from a perspective view prior to assembly, and further illustrating various aspects of the smaller end cap with reinforcement braces, an inner triangular shaped sleeve, and a retaining screw hole to be attached with the retaining screw in accordance with one embodiment.

Referring now to FIG. 4, the second smaller end cap 16 is seen from perspective view, facing upward, the retaining screw 18B and screw flange hole 22B are seen from an exterior view, the reinforcement braces 24B also facing upward and the two parallel mounting holes 26C, 26D seen from an upward exterior position. Accordingly, the width of the smaller bottom end cap sleeve flange 30B being slightly smaller than the width of the lower triangular body in order to facilitate a connection to a slightly smaller width opening of the lower triangular body.

Figure 5:
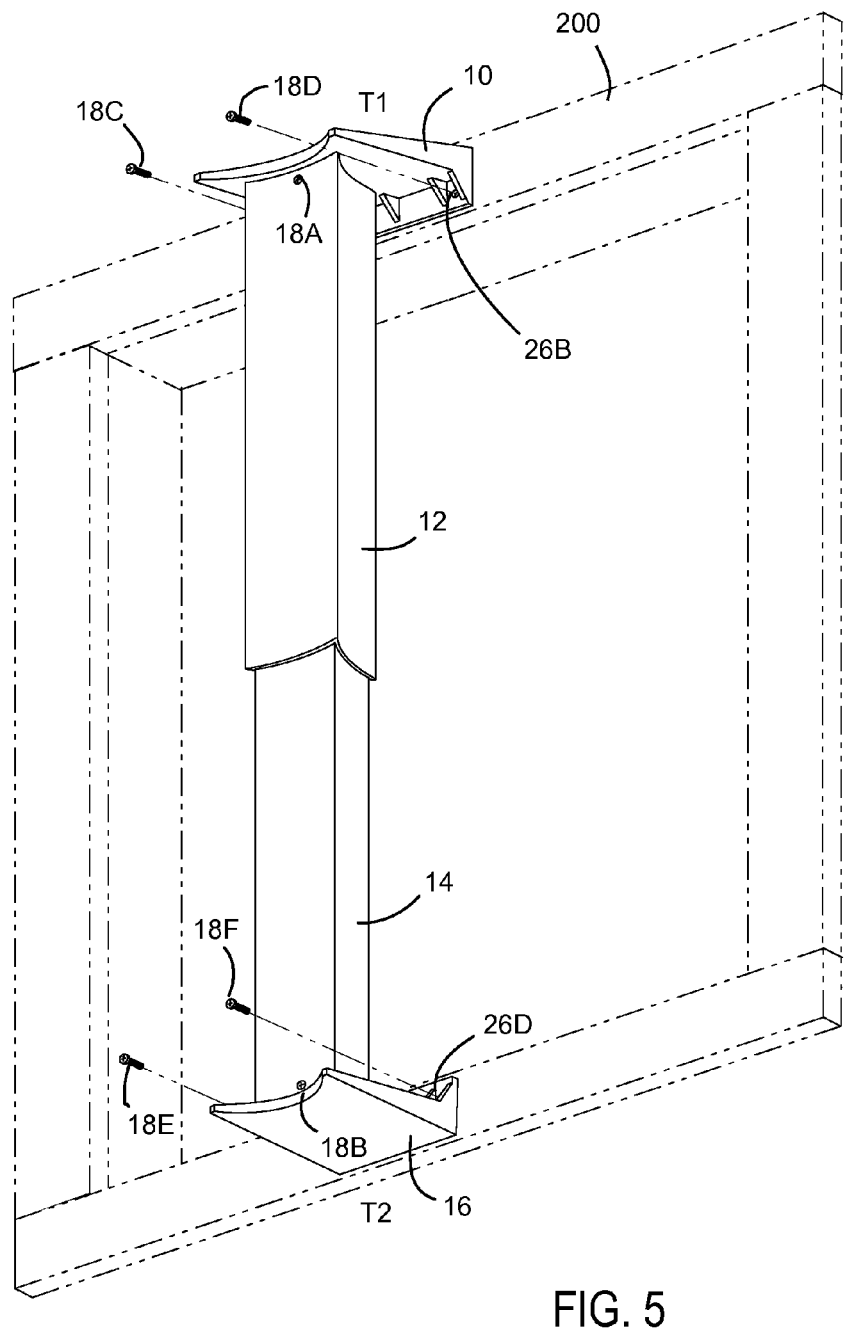
FIG. 5 shows the free breeze accelerator installed and attached to a conventional window frame.

FIG. 5 shows the free breeze accelerator, a wind diverting device, being fully assembled and attached to an exterior structural opening 200 of a conventional window frame (shown in dashed lines as not forming part of the invention). In this regard, the wind diverting device is configured to direct wind passing laterally with respect to the device into the interior space of an associated structure. The wind device comprises a first hollow elongated triangular body 12 concentrically nested with a second hollow elongated triangular body 14 and combining to form an adjustable triangular body portion; the first hollow elongated triangular body 12 is shown coupled to a first end cap 10 at a first triangular flange thereof (FIG. 3, 30A) disposed at a first terminal end T1 of the device; and the second hollow elongated triangular body 14 is shown coupled to a second end cap 16 at a second triangular flange thereof (FIG. 4, 30B) disposed at a second terminal end T2 of the device. Retaining screws 18A; 18B are inserted through body holes (FIG. 2, 20A; 20B) and flange holes (FIGS. 3-4, 22A; 22B) to secure the respective ends of the adjustable tubular body to the first and second end caps, 10; 16, respectively. The wind diverting device is shown attached to the exterior structural opening 200 by mounting screws 18C-18F, the mounting screws are shown inserted through at least mounting screw holes 26B; 26D, and into the exterior structural opening 200 of a conventional window frame.

Operation of the Free Breeze Accelerator with Reference to FIGS. 1-5:

The method of assembling the embodiment consists of inserting each of the four parts into their corresponding matched component. Namely, one first attaches the first larger top end cap 10 into the opening of the first hollow elongated triangular body 12; the first flange 30A of said first end cap 10 inserts into the center of said hollow opening of the first hollow elongated triangular body 12 and is thus secured with a screw 18A through a retaining screw hole 22A.

Wherein the said first hollow elongated triangular body 12 and the first larger top end cap 10 are attached, one then follows the same procedure for the second hollow elongated triangular body 14 and its corresponding second smaller bottom end cap 16; the second flange 30B of said second end cap 16 inserts into the center of said hollow opening of the second hollow elongated triangular body 14 and is thus secured with a screw 18B through a retaining screw flange hole 22B. With each of the said end caps secured to their corresponding body portion, one then holds each body so that the mounting side of both end caps are aligned in the same direction, thus being perpendicular. One then inserts the smaller second hollow elongated triangular body 14 into the hollow opening of the larger first hollow elongated triangular body 12.

As shown in FIG. 1, the embodiment, when fully assembled, is thereby ready to be mounted or adhered vertically to an exterior structure in front of an open structure such as a window.

Mounting can then be accomplished by using independent mounting screws (18C-18F) when placed though each of the parallel mounting holes 26A-26B of the first end cap and 26C-26D of the second end cap; or by use of an independent bonding agent (not shown). Once the first end cap 10 is in position and secured to the outside of the upper frame of the exterior surface, one then uses the telescopic means of lengthening or shortening the two triangular bodies 12; 14 so that the smaller bottom and lower smaller end cap are positioned directly outside of the frame of the opening structure; whereby two additional screws (18E; 18F) can be inserted into the two parallel holes (26C; 26D) of the second end cap 16. Thereby, when the interior structure such as a window is opened, wind can be captured both bilaterally by the embodiment and redirected into the said open structure.

Other Description

Accordingly, the reader will see that the wind diverter device, when vertically mounted, can:

capture and redirect the wind bilaterally into an open interior structure using silent operation, without the use of electricity;

allows the use of recyclable materials, but is not limited to the use of recyclable materials;

allows the use of polyvinyl chloride (PVC) to provide UV protection, and is weather resistant but is not limited to the use of such materials allows extrusions of the said embodiment to be produced in several different lengths and widths to adjust to a variety of exterior structures without altering the operation of the said embodiment;

allows vertical attachment of the embodiment using an independent bonding agent or by use of independent screws but is not limited to the use of such materials;

allows extrusions of the said embodiment to be made in several different lengths and widths using the same operation and is not limited to the extrusion of a specific measurement of length or width;

permits use in a variety of exterior structures and exterior surfaces including motor homes, manufactured homes, residential, institutional and commercial structures, but is not limited to the use in motor homes, manufactured homes, residential or commercial structures; and permits use on the exterior of motor homes and manufactured homes while in transit.

While the above description contains many examples, these should not be construed as limitations on the scope of any embodiment, but as exemplifications of various embodiments thereof. Many other ramifications and variations are possible within the teachings of various embodiments. For example, the end caps may consist of other shapes such as oval, the main body can be adjusted with a fastener or a notch, the end cap holes may be eliminated and replaced with an attached hinge, and the embodiment can be extruded from materials other than polyvinyl chloride (PVC) or plastic.

Thus the scope should be determined by the appended claims and their legal equivalents and not by the examples given.

REFERENCE SIGNS LIST

In the drawings, reference numbers are included for detailing various features of the illustrated embodiment, wherein said features are listed as:
first end cap (10)
first hollow elongated triangular body (12)
second hollow elongated triangular body (14)
second end cap (16)
retaining screws (18A; 18B)
mounting screws (18C; 18D; 18E; 18F)
retaining screw holes (20A; 20B)
flange holes (22A; 22B)
reinforcement braces (24A; 24B)
mounting holes (26A; 26B; 26C; 26D)
first flange (30A)
second flange (30B)
wind diverter device (100)
exterior structural opening (200)
first terminal end (T1)
second terminal end (T2)

What is claimed is:

1. A vertically expandable bilateral wind diverter device formed of resilient weatherproof material to be used on an exterior surface of a potentially open interior structure comprising of two long main bodies, both triangular in shape, each with retaining screw holes, one of smaller width to fit into one of larger width, thus overlapping, the body of larger width in an upper position, the body of smaller width in a lower position to permit manual lengthening and shortening, thus being telescopic; two opposing end caps each with reinforced braces, an inner triangular sleeve, and a retaining screw hole; one of said end caps slightly larger in size and the other of said end caps slightly smaller in size, thus connecting to opposing ends in accordance to size and held into place on each of the main bodies by use of one or more retaining screws; whereby said wind diverter device is vertically positioned to an exterior structural opening, thereby mounted by independent mounting screws, the end caps having two holes for said screws, or adhered by the use of an independent bonding agent.

2. A wind diverting device, comprising:
a first hollow elongated triangular body extending from a first end to a first terminal end opposite of the first end;
a first end cap having a first triangular flange extending therefrom, the first triangular flange being configured to couple with the first terminal end of the first hollow elongated triangular body;
a second hollow elongated triangular body having a second end and a second terminal end opposite of the second end; and
a second end cap having a second triangular flange extending therefrom, the second triangular flange being configured to couple with the second terminal end of the second hollow elongated triangular body;
said first hollow elongated triangular body comprising a diameter larger than that of the second hollow elongated triangular body, the second hollow elongated tubular body being configured for insertion within the first hollow elongated tubular body such that the first and second hollow tubular bodies are configured to be concentrically nested and slideably engaged with one another to form an adjustable triangular body portion;
wherein each of said first and second end caps are further configured to attach to an exterior structural opening of a conventional window frame for providing a means for diverting lateral wind into a structure.

3. The wind diverting device of claim 1, wherein said first end cap is coupled to said first hollow elongated triangular body via a first retaining screw extending therebetween.

4. The wind diverting device of claim 1, wherein said second end cap is coupled to said second hollow elongated triangular body via a second retaining screw extending therebetween.

5. The wind diverting device of claim 1, wherein said wind diverting device is attached to the exterior structural opening of a conventional window frame via one or more mounting screws extending therebetween.

6. The wind diverting device of claim 1, wherein said wind diverting device is attached to the exterior structural opening of a conventional window frame via an adhesive therebetween.

* * * * *